June 2, 1970

C. T. FITZGERALD, JR 3,515,860

PROCESS CONTROLLER WITH DYNAMIC SET-POINT ADJUSTMENT
RESPONSIVE TO THE STATISTICAL VARIANCE OF
THE CONTROLLED PROPERTY

Filed Nov. 6, 1967

CHARLES T. FITZGERALD, Jr.
INVENTOR.

BY

*G. Henry Peterson*

Agent

June 2, 1970   C. T. FITZGERALD, JR   3,515,860
PROCESS CONTROLLER WITH DYNAMIC SET-POINT ADJUSTMENT
RESPONSIVE TO THE STATISTICAL VARIANCE OF
THE CONTROLLED PROPERTY
Filed Nov. 6, 1967   3 Sheets-Sheet 2

CHARLES T. FITZGERALD, JR.
INVENTOR.

BY
*G. Huey Peterson*
Agent

CHARLES T. FITZGERALD, JR.
INVENTOR.

United States Patent Office 3,515,860
Patented June 2, 1970

3,515,860
PROCESS CONTROLLER WITH DYNAMIC
SET-POINT ADJUSTMENT RESPONSIVE
TO THE STATISTICAL VARIANCE OF
THE CONTROLLED PROPERTY
Charles T. Fitzgerald, Jr., Orange Park, Fla., assignor to Industrial Nucleonics Corporation, a corporation of Ohio
Filed Nov. 6, 1967, Ser. No. 680,695
Int. Cl. G06f *15/46;* G05b *13/02, 21/02*
U.S. Cl. 235—151.13
22 Claims

ABSTRACT OF THE DISCLOSURE

Disclosed herein is an apparatus for automatically controlling a continuous material forming process with a controller whose set point is periodically changed or updated in response to a feedback signal from an automatic statistical variance computer, so that when the process variance decreases the controller set-point value approaches a selected limiting value and when the variance increases the set-point value recedes from the limiting value. During the time interval required to carry out an actual variance computation, an auxiliary computer maintains a continually updated running estimate of the next variance value to be expected. When the computed estimate exceeds the previous variance value by a predetermined amount, an alarm is sounded and the set-point value is automatically retracted from the limiting value.

This invention relates to an apparatus for automatically controlling the properties of traveling materials such as those produced in continuous manufacturing processes. More particularly it relates to a controller adapted for dynamic set-point variation in response to a feedback signal from a statistical variance computer.

In such continuous manufacturing processes, wherein a variable property is imparted to the material, it is usually desired to maintain the value of the property as close as possible to a certain limiting value. However, it is usually of great importance to prevent the production of a significant amount of material wherein the property value has been allowed to cross the limiting value. While the integrity of the proscribed limit should be maintained rather absolutely, an improvement in overall quality together with a substantial saving in manufacturing costs can often be achieved by operating the process as close as possible to the limit.

It is the object of the present invention to provide a system which automatically senses the degree of controllability of the process and automatically operates the process closer to, or further from, the proscribed limit, depending on the controllability as measured by the statistical variance of the process, while continuously monitoring the process to provide assurance that the limit will not be violated in the event that the controllability of the process deteriorates either slowly or rapidly.

Other objects and advantages will become apparent in the following detailed description of specific apparatus constituting a preferred form of the invention, taken in conjunction with the appended drawings, in which.

Figure 1:
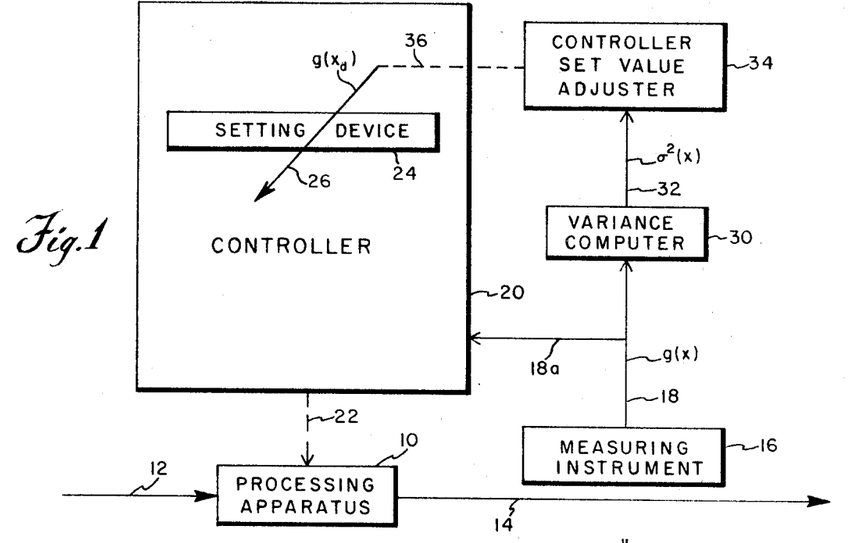
FIG. 1 is a simplified block diagram of a control system in accordance with the invention.

Referring to FIG. 1, there is shown a processing apparatus 10 having a raw materials input 12. Apparatus 10 produces as an output a traveling material 14 having a variable property to be controlled according to the invention. To this end, there is provided a measuring instrument 16 responsive to the material property for producing a measurement signal representing the measured value of said property. This signal appears as an output on line 18 from the measuring instrument 16.

For convenience in general notation, in FIG. 1 the variable value of the material property is herein identified as $x$ and the measurement signal is identified as $g(x)$ to indicate that the signal is a function of $x$. This signal of course can be of any convenient numerical or analog type; it may be proportional to the value of the property or to the deviation of the property value from an arbitrary value, or it may vary according to any other convenient mathematical function of the property. Signal $g(x)$ is received by a controller via a connection 18a. In response to this signal, controller 20 automatically applies suitable corrective adjustments to the processing apparatus 10 for the purpose of maintaining the material property value $x$ as near as practicable to a set-point value or target value $x_d$. The operating connection between the controller 20 and the processing apparatus is represented by the dashed line 22.

Controller 20 is equipped with a setting device 24 which permits selection of the set value $x_d$. In FIG. 1, the setting device is indicated to be variable by the slant arrow 26 to provide a reference setting $g(x)_d$. Controller 20 conventionally includes means for comparing $g(x_d)$ with the variable signal value $g(x)$ from measuring instrument 18 and for automatically varying the processing apparatus adjustment in the proper direction and with the proper amplitude and phase in accordance with deviations of $g(x)$ from $g(x_d)$.

The apparatus so far described in connection with FIG. 1 is conventional, and the general arrangement of the described elements is embodied in a great variety of forms of known process control systems. The performance of such systems is illustrated by the density functions shown in FIG. 2.

Figures 2, 3:
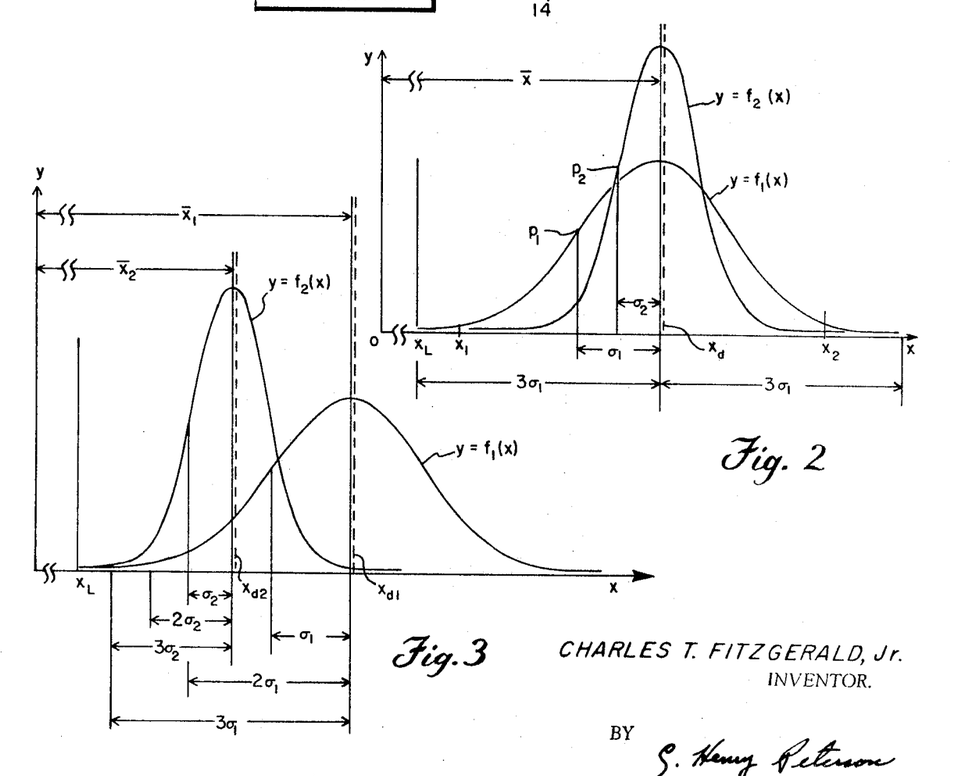
FIG. 2 is a graph showing two process density functions to illustrate the performance of a typical process under conventional automatic control.
FIG. 3 is another graph showing two process density functions to illustrate the performance of one process under automatic control according to the present invention.

In FIG. 2, distances measured from zero along the $x$-axis represent values $x$ of the controlled property of material 14. Distances measured from zero along the $y$-axis will be considered to represent numbers of equal incremental lengths of material 14. $x_d$ represents the set value selected by the adjustment of the controller setting device 24. The automatic controller attempts to maintain $x$ constant at the value $x_d$. If this were possible, all of the incremental lengths of material 14 would have the same value, $x_d$, for the controlled property.

However, due to the inherent variability of materials and machines, the incremental lengths of material do not all have the same $x$-value but a distribution of values including values greater and less than $x_d$, as shown for example by the density function labeled $y=f_1(x)$. For any point on this curve, the distance $y$ is considered to represent the number of incremental lengths of material 14 having the corresponding property value $x$.

The average value for $x$ in all of the incremental lengths involved is the value $\bar{x}$ or mean value. The automatic controller 20 is generally able to maintain the mean value $\bar{x}$ very close to the set value $x_d$, as shown by the nearness of the solid vertical line at the value $\bar{x}$ to the dashed vertical line at the value $x_d$.

However, all processes exhibit a certain amount of dispersion, that is, "wildness" or "scatter" of the $x$-values in the incremental material lengths. Dispersion is conveniently measured by the statisitical variance of $\sigma^2$ or its square root $\sigma$ which is referred to as the standard deviation. In FIG. 2 the standard deviation $\sigma_1$ for the curve $y=f_1(x)$ is illustrated as the distance along the $x$-axis from the value of the mean $\bar{x}$ to the inflection point $p_1$ where the second derivative of the curve is zero. Visually this is the point where the curve has the steepest rise and changes from concave to convex.

If the controlled property has a normal distribution of values as shown by either of the curves in FIG. 2, about 68.3% of the incremental lengths of material will have $x$ values between $\bar{x}-\sigma$ and $\bar{x}+\sigma$, that is, within one standard deviation from the mean $\bar{x}$. Similarly 95.4% of the incremental lengths will have values within two standard deviations ($2\sigma$) of the mean value, and 99.7% will have values within three standard deviations ($3\sigma$) of the mean value $\bar{x}$.

A process is generally considered to be controlled within the limits of $\pm 3\sigma$ from the mean. Although occasionally values of $x$ occur outside these limits, these occurrences are considered accidental. Mathematically, the curves of the density functions extend to infinity on both sides of the mean $\bar{x}$ and approach the $x$-axis asymptotically. Hence, at least in theory, no matter how far away from the expected mean a limit might be set for greater safety, there is always a finite probability, however small, that the limit may be exceeded.

In most processes such as that shown in FIG. 1 for producing a material 14, there is a limiting value of great significance in that the value $x$ should not be allowed to cross the limiting value. This may be either an upper limit, or a lower limit as shown by the value $x_L$ in FIG. 2. At the same time, it is usually desirable to maintain the value $x$ as close as possible to the limit.

A classic example is in the manufacture of tire fabric for automobile tires. Relating this for example to FIG. 1, the processing apparatus 10 may comprise a rubber calender. The material 12 fed to the calender may consist of a plurality of synthetic threads or cords, and a mass of raw synthetic rubber. The calender applies a layer of rubber on each side of the cords. In this example, the variable property $x$ of material 14 is the thickness of the rubber layer. This thickness is continuously measured by instrument 16 which in this case usually comprises a beta radiation thickness gauge. Controller 20 responds to an output signal from the gauge and automatically adjusts the spacing between the calender rolls to maintain the thickness of the rubber layers as close as possible to the set value $x_d$.

However, the layer cannot be applied with perfect uniformity because of many variables. For example, the bulk rubber cannot be made with perfectly uniform composition and plasticity. The calender rolls and their bearings cannot be made perfectly round. There is necessarily a certain amount of play in the moving parts, and this tends to increase with normal wear. Ambient temperature changes cause unequal expansions and contractions of the moving parts. There is a certain amount of backlash or lost motion in the gears and adjusting linkages through which the automatic controller 20 exerts control over the roll spacing. The layer thickness variations occur at various frequencies. Some variations occur so rapidly that they are not affected at all by the action of the controller. In order to most effectively counteract the major layer thickness variations, the controller must take action in such a way that some of the minor thickness variations are actually made worse.

When the tire is built from the tire fabric produced by the machine, several layers, or plies, of this tire fabric are overlapped in the carcass of the tire. The rubber layers form a cushion between the cords. If these rubber layers are too thin, the constant flexing of the tire and the pounding against the road surface will cause rapid wear and abrasion between the cords of the plies until one or more cords is cut through and snaps, possibly resulting in a blow-out and a culminating accident.

To guard against such an occurrence, the manufacturer sets a lower limit, or minimum acceptable thickness, for the layer of rubber applied to the cords in the tire fabric. In FIG. 2, such a lower limit is represented by the value $x_L$. However, the automatic controller set values or target thickness $x_d$ selected must be substantially greater than $x_L$ to provide a margin of safety. In this way, when the inevitable variations cause some of the incremental unit lengths to have thicknesses less than $x_d$, these thicknesses, except for a few possible accidental occurrences, are still greater than the lower limiting thickness values $x_L$. For example, if the thickness distribution is as shown by the curve $y=f_1(x)$, a few unit lengths of material will have a thickness $x_1$ which is substantially less than the set value $x_d$ but is still greater than the lower limit thickness $x_L$.

In setting his target, however, the manufacturer must take into account the fact that the variations in his process will also cause some lengths of material to have thicknesses much greater than the set value $x_d$. For example, as shown by the same curve $y=f_1(x)$ a few lengths of material will have a thickness $x_2$, and this is much greater than the limiting value $x_L$. This excess thickness of rubber unfortunately causes the tire plies to be stiff, so that excess energy is required to produce the normal flexing of the tire in service. The dissipation of this energy generates excessive heat which in time is apt to cause the vulcanized bond between the plies to fail and the plies to separate. In general, an excess thickness of rubber on the tire fabric can significantly shorten the life of a tire. Moreover, the excess rubber used is costly to the manufacturer, and substantial savings can be made if its use can be avoided.

For the foregoing reasons, it is highly desirable to select the set value $x_d$ so that it is as close to the limiting value $x_L$ as possible. At the same time, because of the critical nature of the lower limiting value $x_L$, the set value must be sufficiently greater than $x_L$ to insure that the value of $x$ rarely if ever crosses, or becomes less than, $x_L$.

The closeness with which the set value $x_d$ can be set to the limiting value depends on the amount of dispersion of the process as measured by the calculated value of the statistical variance $\sigma^2$ or its square root $\sigma$, the standard deviation. Variance can be calculated by the formula $$\text{Variance}=\sigma^2=\frac{\Sigma x^2}{N}-\left(\frac{\Sigma x}{N}\right)^2$$

Here $\sigma$ represents the standard deviation, $x$ is the measured value for the variable property of interest( such as the thickness of the rubber layer on tire fabric) in a given incremental length of the material, N is the number of incremental lengths whose $x$ values are measured and $\Sigma x^2$ indicates that all of the measured $x$ values are squared and then added. The quantity $$\Sigma x/N=x$$

is the mean value, which is calculated by adding up all of the $x$ values and dividing by the number of samples to obtain the average value of $x$.

While it is a rather laborious task to measure many samples and compute variance or standard deviation by hand, there are available automatic computers which can be connected to an automatic measuring instrument as at 16, FIG. 1, to provide variance or $\sigma$ values periodically and automatically. Such devices may be analog computers, for example, of the type described in the Radley et al. Pat. No. 2,965,300; they may be of a hybrid, partly digital and partly analog type such as that described in the Spergel Pat. No. 3,150,253, or they may be special purpose digital computers. Likewise, general purpose digital computers are adapted, using well-known programs, to automatically compute these statistical quantities. The computations actually performed may be in accordance with the foregoing or equivalent mathematical equations arranged to best suit the operating mode of the particular type of computer used. In FIG. 1, an automatic variance computer 30 is shown connected to the output signal line 18 from measuring instrument 16. Variance computer 30 provides an output signal $\sigma^2(x)$ on line 32 indicative of the value of the variance $\sigma^2$ of the controlled property of material 14.

As indicated by the two density functions $y=f_1(x)$ and $y=f_2(x)$ in FIG. 2, the value for the variance of a given process is not constant, but subject to change with the conditions under which the process is operated. The curve $y=f_2(x)$ for example, may typically represent the distribution of $x$ values on what might be termed a "good day," perhaps when the raw materials 12 fed to the process are very uniform, when the machinery is in top condition and excellent control is being exerted over the process. Here the $x$ values are grouped closely about the mean $\bar{x}$, and the variance $\sigma_2^2$ and standard deviation $\sigma_2$ have small values.

In a similar way the curve $y=f_1(x)$ may represent the distribution of $x$ values on a "bad day," perhaps when the raw materials are relatively non-uniform, when the machinery is becoming worn or getting out of adjustment, and when in general relatively poor control is being exerted over the process. Here the $x$ values are rather widely dispersed about the mean $\bar{x}$, and the variance and standard dviation $\sigma_1$ have relatively large values. While the time period of a "day" has been used to illustrate the change of process controllability with time, actually it is found that significant changes can occur over much shorter time periods such as hours or even a few minutes.

Conventionally, when the manufacturer starts producing a given material 14 for the first time, or with new or recently overhauled machinery or with a new control arrangement, he begins by setting his target or set value $x_d$ at a considerable distance from the critical limiting value $x_L$. Then each time this material is run, one or more computations of the variance $\sigma^2$ and/or the standard deviation are performed. Eventually a variance record is accumulated, and this allows a fair estimate to be made of the maximum dispersion to be expected. The set value $x_d$ eventually selected is usually based on the variance or standard deviation figures obtained during the worst performances of the process.

With reference to FIG. 2, for example, if $\sigma_1$ is considered to represent the standard deviation on the "bad days" and $\sigma_2$ represent the standard deviation on the "good days," the target $x_d$ is usually set at a value at least equal to $x_L+3\sigma_1$. With this set value, it is expected that even on the worst days not more than about three unit lengths of material in two thousand will have $x$ values less than the lower limiting values $x_L$. This practice is a compromise which takes into account the desirability on the one hand of operating as close as possible to the lower limit $x_L$ in order to produce a better material while realizing a maximum saving of raw materials. On the other hand, this practice hopefully allows a sufficient margin of safety so that in those expected instances where the process happens to exhibit a bad performance from the standpoint of variability, there will be little if any material produced wherein the value of the controlled property has passed beyond the critical limit.

The present invention as illustrated in FIG. 1 employs the variance computer 30 as an element in a feedback arrangement whereby the variance is computed automatically and repetitively, preferably every few minutes, and the set value $x_d$ for the controller 20 is automatically and repetitively readjusted in accordance with the computed variance values. To this end, the variance computed 30 is arranged to supply to a controller set value adjuster 34 a signal $\sigma^2(x)$ indicative of the computed variance $\sigma^2$ of the controlled property values $x$. In response to this signal, the set value adjuster 34 automatically changes the adjustment 26 of the setting device 24 for the controller 20.

As illustrated in FIG. 1, the set value adjuster 34 is coupled through a connection 36 to the setting device 24 so that each time a new variance figure is computed by computer 30, a new reference signal $g(x_d)$ is applied to the setting device.

The operation of this arrangement and its effect on the process is explained with reference to FIG. 3. If it is assumed that initially the process is performing rather poorly with a substantial degree of variation, the distribution of $x$ values may be as shown by the density function $y=f_1(x)$. The degree of variability or dispersion prevailing is indicated by the standard deviation $\sigma_1$. The prevailing set value for the controlled variable $x$ is $x_{d1}$. The controller device 24 has a corresponding set value $g(x_{d1})$. Controller 20 continuously compares the signal $g(x)$ from the measuring instrument with the set value signal $g(x_{d1})$ and make appropriate adjustments to the processing apparatus 10 so as to maintain the mean value $\bar{x}_1$ substantially equal to the set value $x_{d1}$. Since the mean value $x_1$ as shown is somewhat more than $3\sigma_1$ (three standard deviations) from the limiting value, the controlled property value $x$ will rarely if ever cross the limiting value.

Assume that, at a later time, one or more of the adverse conditions responsible for the process variability are improved, for example, after a rather bad batch of non-uniform raw materials has been run through the process and a good batch of uniform raw material is passing therethrough. With better control prevailing, the distribution of $x$ values may be as shown by the density function $y=f_2(x)$. The new, smaller degree of variability or dispersion prevailing is indicated by the new, smaller standard deviation $\sigma_2$.

This new standard deviation will be indicated by the output signal $\sigma^2(x)$ from the variance computer 30 on the next one of its repetitive computations. In response to this new signal, the controller set value adjuster 34 will change the setting on the controller setting device 24, thus supplying a new controller set value $g(x_{d2})$ corresponding to a new target or set value $x_{d2}$ for the controlled property $x$. The direction of the set value readjustment is such that the new set value $x_{d2}$ approaches the limiting value $x_L$ when the variance decreases.

Controller 20 will now compare the signal $g(x)$ from the measuring instrument 16 with the new set value signal $g(x_{d2})$ and will automatically adjust the processing apparatus so as to produce material having a new mean value $\bar{x}_2$ for the controlled property which is very close to the new set value $x_{d2}$. However, because the new standard deviation $\sigma_2$ of the better controlled process is less than the previous standard deviation $\sigma_1$, this new mean value $\bar{x}_2$ will be somewhat more than $3\sigma_2$ (three standard deviations) from the limiting value $x_L$, and the controlled property value $x$ will still rarely if ever cross the limiting value.

The action of the set value adjuster 34 is in the opposite direction when the computed variance increases. For example, at some future time the excellent control exerted over the process may deteriorate somewhat so that the dispersion or scatter of the $x$ values is somewhat between that shown by the curve $f_1(x)$ and that shown by the curve $f_2(x)$. This change will result in an increased variance value's being indicated by the variance computer 30 output on a subsequent one of the repetitive variance computations. As a result, the set value adjuster 34 will cause the set value to recede from the limiting value so that a new set value is established somewhere between $x_{d2}$ and $x_{d1}$.

The operation of the system in causing the set value, and in turn the mean value, to approach the limiting value when the variance decreases can often provide significant increases in the overall quality of suitability to its purpose of a product material such as in the tire fabric example given above. In this case, the system automatically determines when good control is being exerted over the calendering process and automatically reduces the excess margin of safety which is causing too much rubber to be laid over the tire cords and thereby shortening the life of the tires. At the same time, the system saves the manufacturer the cost of the excess rubber used. In short, it enables him to produce tire fabric of better average quality at lower cost.

Conversely, the operation of the system is causing the set value, and inturn the mean value, to recede from the limiting value when the variance increases provides insurance against the inadvertent production of a significant amount of material which is unacceptable because the critical limiting value is not upheld. In this case the system automatically determines when good control cannot be exerted over the process, and automatically increases the margin of safety so that the critical limit is not substantially violated.

The foregoing discussion has been concerned in general with processes wherein the critical limit is a lower limit $x_L$. While only one specific example, that of tire fabric rubber layer thickness, has been outlined in detail, similar or analogous situations prevail with respect to process variables in many other industries such as papermaking, steel strip rolling, galvanizing lines, tin plate lines, plastics extrusion or calendering, coating processes, many chemical processes and the like. In all of these industries, it is of great importance to maintain rather absolutely the integrity of at least one quality limit, while maximizing the utilization of a valuable ingredient.

In the case of other process variables, it is desirable to maintain the controlled property value as large as possible, without exceeding an upper limiting value. Such is the case, for example, in controlling the percentage moisture content of paper produced by a Fourdrinier or other type of papermaking machine. Relating this to the system of FIG. 1, the processing apparatus 10 comprises a papermaking machine. The basic raw materials 12 fed into the machine are great quantities of water mixed with a very small percentage by weight of cellulose fiber. A large amount of water is removed in successive stages of vacuum draining equipment, press sections, and an extensive dryer section where the papper sheet passes, for example, through a series of dryer drums which are heated by pressure-regulated steam to dry the final paper sheet material 14 to a final moisture content. The material property to be controlled here is the variable percent moisture $x$ in the sheet 14.

To this end, a moisture gauge 16 provides a signal $g(x)$ indicative of the precent moisture to a controller 20 and a variance computer 30. Controller 20 may be a relatively simple device for regulating the steam pressure in the dryers, or it may be a relatively complex process control computer adapted to regulate the speed of the entire paper machine. The controller responds to the signal from the measuring instrument and adjusts the papermaking machine 10 so as to maintain the moisture content in the sheet 14 as close as possible to a set value.

It is desired to maintain the moisture content as high as possible for any one or more of several reasons. Most printers prefer to receive paper with a high moisture content, since it takes ink better and is dimensionally more stable so that more accurate registration of the several monochromatic images can be achieved. The drying of paper with heat, as in the steam dryer drums of the papermaking machine dryer section, is very expensive, and it is poor economy to reduce the moisture content any more than is really necessary. Paper which is quite dry has less resistance to tearing and thus increases the likelihood of expensive sheet breaks. Some paper machines are said to be "dryer limited" in that the speed of the paper machine is limited by the capacity of the dryers to remove moisture from the paper. A dryer limited machine can be run at maximum speed, to achieve a maximum production rate, only when the maximum permissible amount of moisture is allowed to remain in the paper.

On the other hand, for various reasons, the manufacturer must set an upper limiting value for the amount of moisture allowed to remain in the final sheet. Paper with excess moisture has a sogginess and sagginess which makes it difficult to build a reel at the windup. It is also apt to "turn black" where the translucence of damp paper causes it to have a black appearance when it is wound up on the reel. "Black paper" is never shipped to customers, and must be sent back for expensive reprocessing.

Figure 4:
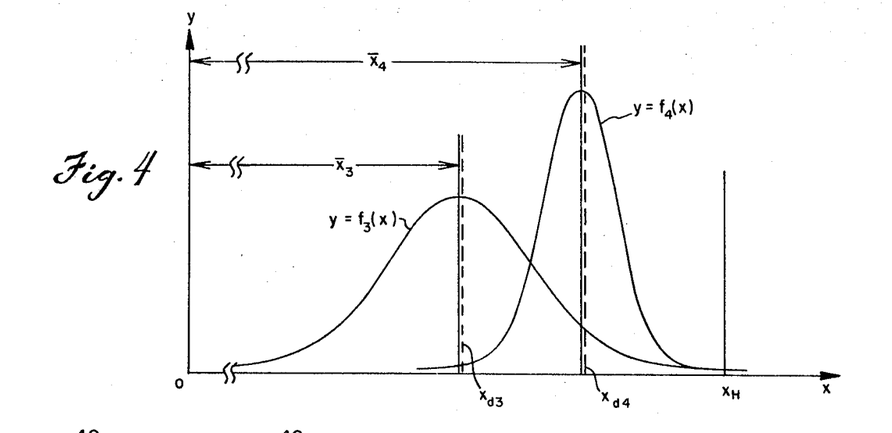
FIG. 4 is a graph similar to FIG. 3 illustrating the performance of another process under automatic control according to the invention.

The operation of the system of FIG. 1 in controlling a process having an upper limiting value is illustrated in FIG. 4. Here the upper limiting value, as for the maximum permisisble percentage moisture, is set at $x_H$. When the variance increases, say to a value characteristic of the density function $y=f_3(x)$, the set value adjuster 34 causes the set value to be reduced to $x_{d3}$, whereupon the controller 20 operates to reduce and maintain the mean value at $\bar{w}_3$, very close to $x_{d3}$.

When the variance decreases, say to a value characteristic of the density function $y=f_4(x)$, the set value adjuster causes the set value to be increased to $x_{d4}$, whereupon the controller 20 operates to increase and maintain the mean value at $\bar{w}_4$ very close to $x_{d4}$. In this case, as in the case illustrated by FIG. 3, the set value is caused to approach the limiting value when the variance decreases and to recede from the limiting value when the variance increases.

Some industrial processes can profitably utilize more than one control system, operating in either or both of the two modes illustrated by FIGS. 3 and 4 respectively. A papermaking machine, for example may employ a moisture control system using the FIG. 4 operating mode as described, and additionally a basis weight control system, utilizing the FIG. 3 operating mode, may be provided. In the basis weight controller, the measuring instrument 16 preferably comprises a beta radiation gauge responsive to the weight per unit area of the nominally dry paper sheet delivered to the size press or to the windup, and the controller 20 regulates the flow of fibrous paper stock supplied to the headbox.

Figure 5:
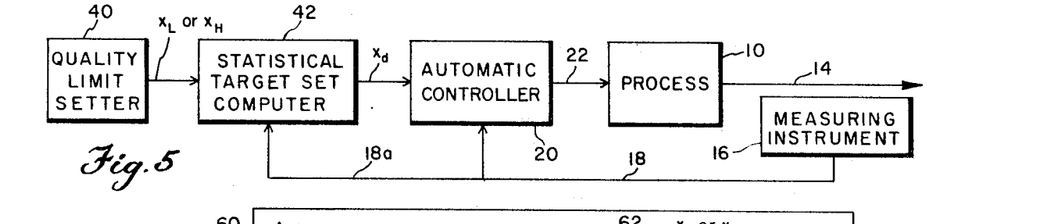
FIG. 5 is a simplified block diagram of a preferred embodiment of the invention.

FIG. 5 shows a simplified apparatus in accordance with a preferred embodiment of the invention. This block diagram shows a conventional process 10 producing a material product 14 which is measured by a measuring instrument 16. A conventional automatic controller 20 receives a signal via line 18 from the measuring instrument, and in response to this signal provides an output signal 22 for controlling the process 10. The output signal from the controller is a function of the difference between the measuring instrument signal on line 18 and a set-point signal $x_d$. (As a shorthand notation in FIGS. 5–8 and in the remainder of the description, signal lines and signals representing quantities such as $x_d$ are simply identified with the symbol for the quantity per se, rather than using the strictly proper functional rotation previously used, such as $g(x_d)$, $g(x)$, $g(\sigma)$, etc.) Conventionally, the set-point signal $x_d$ is a constant signal which is applied manually or automatically to the controller, and represents a fixed, predetermined value of the controlled process variable which is maintained as constant as possible by the automatic controller.

In the preferred embodiment of the invention, in simple terms the conventional constant set-point adjustment or constant reference signal generator is replaced by a quality limit setting device 40 and a statistical target set computer 42. The quality limit setting device 40 may be similar or even identical to the conventional set-point adjustment or constant set-point signal generator which provides the constant signal $x_d$ in the conventional control system. The limit setter 40 is adjusted either manually or automatically, and functions to provide a constant signal $x_L$ or $x_H$ representing the desired lower or upper limiting value $x_L$ or $x_H$ previously described with reference to FIG. 3 and FIG. 4 respectively. The statistical target set computer 42 receives the constant signal from limit setter 40, as well as the signal via line 18$a$ from measuring instrument 16, and computes a dynamically shifting or changing controller set-point value. The set-point signal $x_d$ supplied to the automatic controller 20 preferably changes its value periodically each time the variance computer (not shown in FIG. 5), incorporated in target set computer 42, completes one of its repetitive variance computations. Each time the dynamically shifted set-point signal $x_d$ changes values, controller 20 operates to control the variable property $x$ of material 14 in an attempt to maintain it constant at a new value represented by the new value of the set-point signal.

Figure 6:
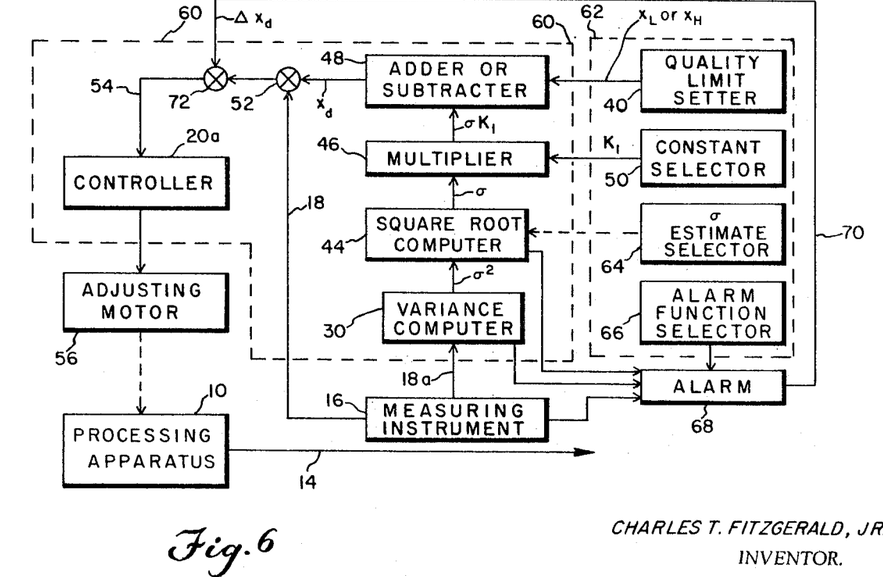
FIG. 6 is a block diagram showing the control system of FIG. 5 in more detail.

FIG. 6 shows the preferred embodiment in more detail. Here the target set computer 42 of FIG. 5 comprises a variance computer 30, a square root computer 44, a multiplier 46, an adder or subtracter 48 and a constant selector 50. The quality limit setter is again shown by the reference numeral 40. This computer arrangement is adapted to compute the target signal values or set-point value in accordance with the appropriate one of the following equations:

$$x_d = x_L + \sigma K_1 \qquad (1a)$$

$$x_d = x_H - \sigma K_1 \qquad (1b)$$

In the operation of this arrangement, variance computer 30 receives the signal from the measuring instrument via line 18$a$ and periodically computes the value of the variance $\sigma^2$. Square root computer 44 receives a variance signal from the variance computer and computes the standard deviation $\sigma$. Multiplier 46 receives the signal $\sigma$ from square root computer 44. Multiplier 46 also receives a signal $K_1$ from the constant selector 50. Constant selector 50 may be similar or identical to a conventional automatic controller set-point selector, and functions in the same manner as the quality limit setter 40. The conventional device 50 allows a suitable constant value to be selected by means of a manual or automatic adjustment and provides an output signal $K_1$ to multiplier 46 according to the value of the selected constant. Multiplier 46 multiplies the value of the standard deviation $\sigma$ by the constant $K_1$ to provide a signal $\sigma K_1$ to the adder or subtracter 48. The adder or subtractor 48 also receives the selected constant signal $x_L$ or $x_H$ from the quality limit setter 40 and provides an output signal $x_d$ to a conventional comparator or algebraic summing device 52.

Summing device 52 also receives from measuring instrument 16 a signal via line 18, which signal is representative of the measured value $x$ of the controlled property of material 14. Conventionally, the signals from the measuring instrument and from the adder or subtracter are applied to summing device 52 with opposite polarities or opposite phases, and the signal output from the summing device is proportional to the difference between the two signals. This difference signal constitutes the error signal to a controller 20$a$, and is applied to the controller via line 54 through a further summing device 72, similar to device 52, whose purpose is further explained in connection with the description of FIG. 7. The controller 20$a$ operates a process adjusting motor 56 for operating the adjusting mechanism for the processing apparatus 10. The controller adjusting motor typically constitute a form of integrator mechanism responsive to the error signal on line 54 in such a way that the direction in which the motor is operated depends on the polarity or phase of the error signal, and in which the number of revolutions of the motor is proportional to the magnitude of the error signal.

Where the limiting value set by means of limit setter 40 is a low limit $x_L$, device 48 constitutes an adder for computing the set value $x_d$ in accordance with Equation 1$a$. Where the limiting value is a high limit $x_H$, device 48 constitutes a substracter for computing the target signal $x_d$ in accordance with Equation 1$b$.

Depending on the manner in which it is most convenient for the manufacturer to compute his safety factors, other computations may be used to determine the value of the dynamic set value signal $x_d$. For example, it may be found more appropriate to compute the dynamic set value according to one of the following equations:

$$x_d = x_L + PV + K_2 \qquad (2a)$$

$$x_d = x_H - PV - K_2 \qquad (2b)$$

In these equations, the quantity PV (process variation) represents $2\sigma$ (two standard deviations of the process variation) and $K_2$ is a constant.

Where Equations 2$a$ and 2$b$ are used, the apparatus of FIG. 6 is modified in a simple manner so that the multiplier 46 always multiplies $\sigma$ by 2. The constant selector 50 is adapted to provide a signal representing the constant $K_2$, and the signal representing $K_2$ is fed directly into adder or subtracter 48 which is modified to algebraically add all three terms involved in the equations. Obviously, other computations and appropriate computer arrangements may be used if desired.

While the system of FIG. 6 may be embodied in various forms of apparatus, for purposes of illustrating a preferred embodiment, the variance computer 30, square root computer 44, multiplier 46, adder or substracter 48, summing devices 52 and 72 and controller 20$a$ are shown to be constructed in the form of a special-purpose, "hard wired" digital computer enclosed by the dashed line enclosure 60. For purposes of illustration also, the quality limit setter 40 and the constant selector 50 are shown to be enclosed within a dashed line enclosure 62 representing a commercial punch card reader adapted to "read" the usual punch cards employed in automatic data processing equipment. With this arrangement, the specifications for a given run or grade of material to be produced by the processing apparatus 10 are encoded on a punch card which is inserted into the card reader by the machine operator at the beginning of a production run. Included in the coded information on a card are the quality limits $x_L$ or $x_H$ and the constant $K_1$.

Another constant value which is inserted into the computer by the punch card reader is an estimated value of $\sigma$, the standard deviation, which is based on the past performance history of the process. The provision for inserting this constant is indicated by the box 64. In the digital computer arrangement illustrated, the computed value of $\sigma$, which constitutes the output of square root computer 44, appears as a coded number in the square root computer output register. When the punch card controlled setup of the computer is effected by the card reader at the utset of a production run, the $\sigma$ estimate selector 64 inserts the estimated $\sigma$ value into the output register using a conventional computer setup routine. This insures that multiplier 46 does not receive a zero value for $\sigma$ in the event the square root computer register has been cleared. It also insures that an extraneous $\sigma$ value based on the computations performed on some other, perhaps widely different, grade of material will not be used to determine the initial set value $x_d$.

In the event that an analog computer is used rather than the digital computer 60, the σ value supplied by the square root computer 44 generally constitutes an output voltage appearing across a feedback capacitor in an operational amplifier, or it may be derived from the voltage output tap of a servo-driven potentiometer as described for example in the cited Spergel Pat. 3,150,253. In this case, the σ estimate selector 64 may supply a fixed voltage for charging the capacitor or cause an appropriate repositioning of the servo-driven potentiometer in accordance with well-known techniques such as those described in the Schuck Pat. 2,715,203 or in the Gibson et al. Pat. 3,110,885.

Further input data obtained from the punch cards read by card reader 62 is utilized by what is termed an alarm function selector 66. Selector 66 provides input signals, in a manner to be described, to an alarm device 68, which according to a preferred embodiment of the invention also receives input signals from the measuring instrument 16, the variance computer 30 and the square root computer 44.

According to the present invention, the device 68 is more than a simple annunciator such as an alarm horn, bell, or flashing light. The computation of variance is a process which requires a considerable length of time, usually at the least several minutes, since measurements must be made on a considerable length of the traveling material 14. During the time that this length of material is passing the measuring instrument 16, a large number or continuum of values must be accumulated and stored or integrated in the registers or analog integrators of the variance computer 30. After one computation of variance has been performed, the set-point signal $x_d$ provided by the adder 48 to the comparator or summing device 52 remains constant according to the computed variance value during the period of time while the next computation of variance is being performed. However, during this period of time it is quite possible that a drastic change in the controllability of the process will occur, due to some suddenly occurring fault in the processing apparatus or due to a sudden change in the quality of one of the raw material ingredients supplied to the process. Such an occurrence, which results in a rapid increase in the variance of the controlled property of the material, would not normally be detected as an increase in the variance until the end of the normal variance computation period. In the mean time, a considerable amount of material could be produced wherein the controlled property has crossed the critical limiting value.

To guard against such an occurrence, the alarm device 68 according to the present invention monitors the variance which is in process of computation, and if it is found that the process variance being computed is going to exceed certain prescribed limits relative to the current variance value and the current set value, the system takes immediate action, not only by sounding an alarm in the usual sense but also by causing the controller setpoint value to back off or recede from the limiting value. According to the preferred embodiment of the invention, the alarm device 68 in such a case provides a setpoint bias signal $\Delta x_d$ to the controller via line 70. This signal is applied to the further comparator or summing device 72 connected to the input 54 of controller 20a. The summing device 72 adds the bias signal $\Delta x_d$ to the regular error signal $x-x_d$ which appears at the output of the first summing device 52. Depending on whether a high limit $x_H$ or a low limit $x_L$ is involved, the polarity or phase of the signal $\Delta x_d$ is such that it causes controller 20a to adjust the process in the direction which causes the controlled value to move away from the limit.

Figure 7:
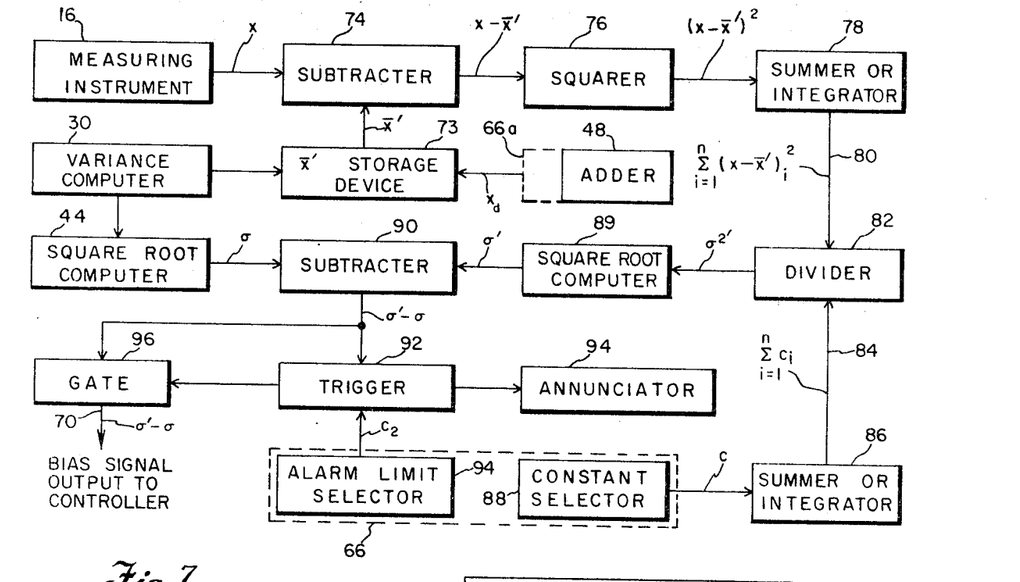
FIG. 7 is a block diagram showing in more detail the alarm system of FIG. 6 including the monitor computer and controller bias signal generator arrangement.

The preferred arrangement of the alarm system is shown in FIG. 7. The inputs to the alarm system as also shown in FIG. 6 are provided by the measuring instrument 16, variance computer 30, square root computer 44 and the alarm function selector 66 shown in FIG. 7 as enclosed within the dashed line rectangles 66 and 66a. As is well known, a variance computer 30, for processes such as those illustrated herein where the mean value of $\bar{x}$ is a variable with time, must include means for computing the mean $\bar{x}$ in order to compute the variance. The means is an accumulated value which is not known until near the end of the variance computation period. At this time, a signal representing the value of the mean $\bar{x}$ is stored in a register or integrator of the variance computer. Since the mean $\bar{x}$ per se is a useful statistical quantity, it is customary to provide the variance computer with means for recording the value of $\bar{x}$, usually by programming the variance computer to provide a binary coded output to an automatic electric typewriter (not shown) which types out the $\bar{x}$ value along with the σ value. This occurs before the $\bar{x}$ register in the variance computer is reset so that this register can then begin to accumulate a new $\bar{x}$ value.

In the system of FIG. 7, an auxiliary storage device 73 is provided so that when the $\bar{x}$ value is ouputted to the typewriter or other recording device, the $\bar{x}$ value is also received as an input to storage device 73 for storage therein. As indicated on the drawing, the mean value stored in storage device 73 is identified as $\bar{x}'$ to indicate that it is not the $\bar{x}$ value in process of being computed but the value obtained from the previous $\bar{x}$ computation.

When the punch card controlled setup of the computer is effected at the outset of a production run, say for a new grade of material, the $\bar{x}'$ value is erased from the storage device 73 and the initial target set value $x_d$ derived from adder 48 (FIG. 6) is registered therein instead. As indicated by the dashed line box 66a, this function is performed by the alarm function selector 66 in a manner similar to that described above for the σ estimate selector 64. Alternately, storage device 73 may be set up directly with an arbitrarily selected initial target value $x_d$ in a manner similar to that described in the copending application of David J. Shoemaker et al., Ser. No. 634,-594, filed Apr. 28, 1967 for "Digital Setup Apparatus. . . ."

The signal value stored in storage device 73 is fed to a substracter 74 which also receives the variable signal $x$, from measuring instrument 16, indicative of the instantaneous value of the controlled process variable. The difference signal $x-\bar{x}'$ is fed to a squaring device 76 which squares the difference signal and feeds the squared signal to a summer or integrator 78. Device 78 continually accumulates the sum of the squared difference signals and provides a continually increasing output, on line 80, of a signal indicative of the sum of these values.

The signal on line 80 is applied to a divider 82. Divider 82 also receives a signal via line 84 from a further summer or integrator 86. The summer or integrator 86 functions in the same manner as summer 78, but the input to summer 86 is a constant signal $c$ provided by a constant selector 88 which constitutes a part of the alarm function selector device 66. The signal on line 84, like the signal on line 80, has a continually increasing value which represents the sum of a continually increasing number of constant values $c$ which are being added. In the hardwired digital computer arrangement illustrated, the successive additions performed by summers 78 and 86 are timed to occur simultaneously by the same digital clock (not shown) so that the signals on lines 80 and 84 represent the results of the same number of additions. Thus the signal on line 84 simply represents the number $n$ of additions which have been performed by summer 78, or the time period during which the sum has been accumulating. In an equivalent analog system, devices 78 and 86 are integrators, and while integrator 78 is integrating the value of the difference signal, integrator 86 will be computing the integral, with respect to time, of the constant $c$. Thus in the analog system, the signal on line 84 will be simply proportional to the time interval during which integrator 78 has been in operation.

Divider 82 divides the value of the signal on line 80 by the value of the signal on line 84 to provide a synthetic variance output signal value $\sigma^{2\prime}$. Here the prime symbol is used to indicate that the variance value obtained represents the average squared deviation from the previous mean value $\bar{x}'$ rather than the average squared deviation from the mean value $\bar{x}$ presently being computed in variance computer 30, which value is as yet unknown.

The output of divider 82 is fed into a square root computer 89 which computes a synthetic variance value $\sigma'$ which is fed to a subtracter 90. Subtracter 90 also receives from the square root computer 44 (also shown in FIG. 6) a signal indicative of the $\sigma$ value obtained from the previous variance computation. During the variance computation interval, the computer 44 is inactive, but is maintaining the previous $\sigma$ value in its output register. Subtracter 90 provides an output signal which is continually updated to indicate the current value of the difference between $\sigma'$ and $\sigma$. This signal is fed to a trigger device 92 which also receives a constant signal $c_2$ from an alarm limit selector 94 which constitutes one section of the alarm function selector 66. The signal $c_2$ is indicative of a selected limiting value for the difference signal $\sigma' - \sigma$.

When the difference signal becomes larger than the signal value $c_2$, the trigger device 92 is activated and energizes an annunciator 94 such as an alarm horn, bell or flashing light to alert the operator to the fact that something is causing a rapidly increasing dispersion of the process. At the same time, the trigger 92 enables a gating device 96 which also receives the variance difference signal $\sigma' - \sigma$. At this time, the variance difference signal is transmitted through gate 96 to line 70 (FIG. 6) whereby it is applied as a bias signal to the controller via summing device 72.

While an alarm system which actually monitors the variance being computed as in the system of FIG. 7 is preferred, some simpler arrangement of a previously known type can be used if desired. For example, in the simplest type of alarm the signal $x$ from the measuring instrument can be monitored and an alarm sounded when a predetermined number of $x$ values are found to have crossed an arbitrary limit value selected to be somewhat closer to the target value than the critical limiting value for the process.

Figures 8A, 8B:
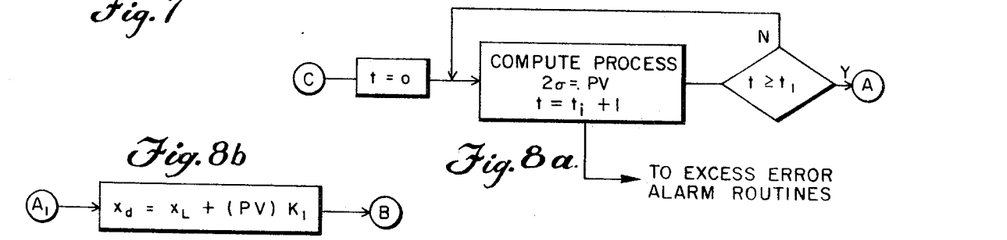
FIG. 8, consisting of five portions labeled FIG. 8a–FIG. 8e is a computation flow chart for dynamic target or set-point updating according to the invention.
Figures 8C, 8D, 8E:
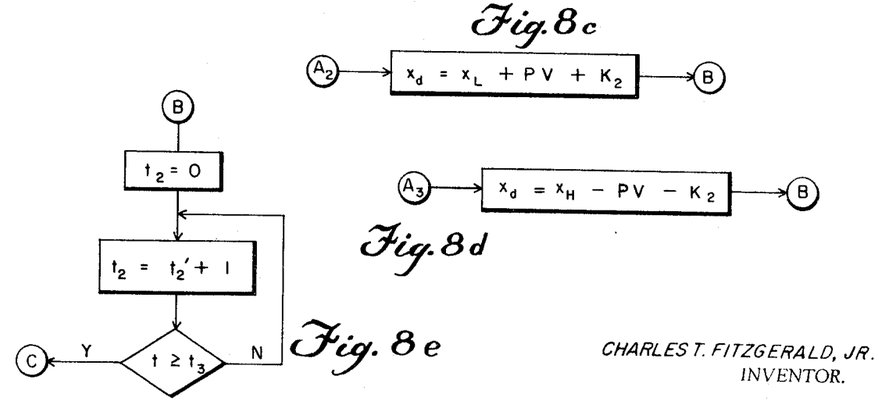

In the foregoing explanation, the invention has been illustrated and described as it is embodied in the preferred form of a special purpose digital computer. However, the computation functions can be performed by a suitably programmed general purpose digital computer. A computation flow chart for such a program is shown in FIGS. 8a to 8e. FIGS. 8b, 8c, and 8d illustrate alternative computations which may be used for the dynamic target or set-point updating. FIGS. 8b and 8c indicate alternative computations in accordance with Equations 1a and 2a as previously described, and may be used where the lower limiting value $x_L$ is significant. Appropriate changes are made to these computations in accordance with Equations 1b or 2b where it is an upper limit $x_H$ which is significant. FIG. 8d illustrates a computation in accordance with Equation 2b. FIG. 8e illustrates very simply a sub-routine which is carried out during a time period $t_2$ to $t_3$, during which time period computation is suspended while various switching functions, transfer of binary coded signals from one register to another, resetting operations and the like are carried out. Thereafter, a repetitive computation cycle begins as shown in FIG. 8a.

As suggested by FIG. 8a, instead of simply summing or integrating to obtain the quantities $\Sigma x^2$ and $\Sigma x$ during the full variance computation periods $t=o$ to $t=t_1$ or until N sets of values have accumulated, complete computations of $\sigma^2$, $\sigma$, $2\sigma = PV$ etc., can be made at the ends of much shorter intervals and the results can be outputted, for use in suitable alarm routines, at times $t_i$, that is, at the end of the $i$th shortened time interval. It is necessary, however, to recognize the fact that where less than N values are used in the computations, or where the integration time is less than the optimum time interval from $t=o$ to $t=t_1$ some error is present. The error due to ordinary sampling considerations can be compensated by the computer using well known formulas. However, it must also be recognized that the total process variation consists of variations at a multitude of superposed variation frequencies peculiar to each process. Thus some experience with a given process is necessary to determine the compensation functions and specific alarm limits to be used. The computation scheme illustrated by FIG. 8a thus can also provide a computed running estimate of the variance during the regular variance computation intervals which can be made sufficiently accurate for the emergency controller reset and alarm signal purposes at hand.

The principle of the present invention can obviously be extended when required by the use of more sophisticated computation schemes. For example, by known techniques the density functions can be analyzed for skewness and kurtosis, and appropriate corrections can be made automatically to the computed set-point values. Likewise, it is possible to anlyze complex density functions with multiple peaks, representing the superposition of two or more simpler functions, as explained in the article "Statistical Computers Can Really Reduce Data" by E. J. Schubert in Control Engineering, April 1960, pages 146–150, and again suitable corrections can be made to the computed set-point values. In the control of a sheet-making process such as on a papermaking machine, automatic control is frequently based on measurements derived from a scanning gauge in which the gauging head moves from side to side across the width of the traveling sheet. Complex density functions are commonly obtained in such measurements where one section of the sheet width has a different average value, and perhaps a different variance, from another section.

It is to be noted that the present invention is to be distinguished from certain previously proposed adaptive control systems wherein a signal representing the value of a computed statistical quantity is used to automatically readjust a response characteristic of an automatic controller. One such system is suggested in the above-referenced Control Engineering article. In these systems the computed statistic quantity is not used as a basis for altering the set-point value as in the present invention, but for altering the transfer function $G(s)$ of the controller. Simply stated for purposes of comparison, in accordance with the previously proposed systems the controller $20a$ of the present FIG. 6 might be provided with a gain and/or phase control which determines the particular manner in which the controller $20a$ responds to its input error signal on line 54. By automatically adjusting this gain or phase control in accordance with a computed statistical quantity, the mean squared deviation of the process from the set-point value may be minimized. Such a feature may of course be incorporated in controller $20a$ if desired, and the inclusion of such a feature is within the scope of the present invention.

The present invention is also to be distinguished from process controllers responsive to the output of what might be termed an adaptive limit gauge, such as in the system disclosed in the Maker Pat. No. 2,897,638. These gauges include means for automatically setting limits for the measured variable, and the limits are usually in the vicinity of the ends of a range somewhat greater than the range from $x_d - \sigma$ to $x_d + \sigma$. The numbers of $x$ values falling inside and outside such a range are compared, and the width of the range is reset automatically in accordance with the differences. The width of the range indicates the degree of dispersion and is related to the variance and standard deviation. However, to my knowledge no proposal has even been made to utilize a range width signal to automatically control the set value or target value $x_d$.

While the invention has been described in terms of specific apparatus, such showing and description is meant to be illustrative only and not restrictive, since obviously many changes, modifications and even outwardly quite different embodiments of the invention can be made without departing from the spirit and scope of the invention as is set forth in the appended claims.

What is claimed is:

1. In the combination of a processing apparatus for imparting to a traveling material a variable property whose actual value should be maintained as close as possible to a limiting value without crossing said limiting value, with a measuring instrument responsive to said property for producing a measurement signal representing the measured value of said property and a controller having an adjustable setting device and being responsive to said measuring instrument for regulating the processing apparatus so as to maintain the mean value of said property substantially equal to a set value determined by the adjustment of said setting device, the improvement of a statistical computer feedback arrangement for automatically causing said mean value to be maintained as close as possible to said limiting value while substantially preventing said actual value from crossing said limiting value, comprising computer means responsive to said measurement signal for providing a computer output signal which is a function of the statistical variance of said property, and means responsive to said computer output signal for automatically adjusting said controller setting device so as to cause said set value to approach said limiting value when said statistical variance decreases and to recede from said limiting value when said statistical variance increases.

2. Apparatus as in claim 1 which includes limit setting means for producing a signal indicative of said limiting value, and wherein said controller setting device adjusting means comprises means for mathematically combining said limiting value indicative signal with said statistical variance functional signal to produce a signal indicative of said set value, the adjustment of said controller setting device being determined by the value of said set value indicative signal.

3. Apparatus as in claim 1 wherein said computer means further comprises means for computing the standard deviation $\sigma$ of said variable property in accordance with the relation $\sigma = \sqrt{\sigma^2}$ wherein $\sigma^2$ is the variance of the property as represented by said variance signal, and means for computing said set value in accordance with one of the relations expressed by $$x_d = x_L + \sigma K_1$$

and $$x_d = x_H - \sigma K_1$$

wherein $x_d$ is said set value, $x_L$ and $x_H$ are selected low and high limiting values respectively for said limiting value of said property, and $K_1$ is a selected constant.

4. Apparatus as in claim 1 wherein said computer means further comprises means for computing the standard deviation $\sigma$ of said variable property in accordance with the relation $\sigma = \sqrt{\sigma^2}$ wherein $\sigma^2$ is the variance of the property as represented by said variance signal, and means for computing said set value in accordance with one of the relations expressed by $$x_d = x_L + PV + K_2$$

and $$x_d = x_H - PV - K_2$$

wherein $x_d$ is said set value, $x_L$ and $x_H$ are selected low and high limiting values respectively for said limiting value of said property, $PV = 2\sigma$, and $K_2$ is a selected constant.

5. In the combination of a processing apparatus for imparting to a traveling material a variable property whose actual value should be maintained as close as possible to a limiting value without crossing said limiting value, with a measuring instrument responsive to said property for producing a measurement signal representing the measured value of said property, means for producing a set-point signal representative of a reference value for said property, and controller means responsive to said measuring instrument and to said set-point signal for regulating the processing apparatus so as to maintain the mean value of said property substantially equal to a set value determined by the value of said set-point signal, the improvement of a statistical computer feedback arrangement for automatically causing said means value to be maintained as close as possible to said limiting value while substantially preventing said actual value from crossing said limiting value, comprising computer means responsive to said measurement signal for providing a computer output signal which is a function of the statistical variance of said property, and means responsive to said computer output signal and connected to said set-point signal producing means for automatically changing the value of said set-point signal so as to cause said set value to approach said limiting value when said statistical variance decreases and to recede from said limiting value when said statistical variance increases.

6. In the combination of a processing apparatus for imparting to a traveling material a variable property whose actual value should be maintained as close as possible to a limiting value without crossing said limiting value, with a measuring instrument responsive to said property for producing a measurement signal representing the measured value of said property, means for producing a set-point signal representing a reference value for said property, and controller means responsive to said measuring instrument and to said set-point signal for regulating the processing apparatus so as to maintain the mean value of said property substantially equal to a set value determined by the value of said set-point signal, the improvement wherein said set-point signal producing means includes a statistical target set computer comprising a limit setting device for producing a signal representing said limiting value, and variance computer means responsive to said measurement signal for producing a signal representing the statistical variance of said variable property of said material, and means responsive to said limiting value representative signal and to said variance representative signal for producing said set-point signal so as to cause said set value represented thereby to approach said limiting value when said variance decreases and to recede from said limiting value when said variance increases.

7. Apparatus as in claim 6 wherein said means for producing said set-point signal comprises means for computing the standard deviation $\sigma = \sqrt{\sigma^2}$ wherein $\sigma^2$ is the variance of the property as represented by said variance signal, and means for computing said set value in accordance with one of the relations expressed by $$x_d = x_L + \sigma K_1$$
$$x_d = x_H - \sigma K_1$$

and wherein $x_d$ is said set value as represented by said set-point signal, $x_L$ and $x_H$ are low and high limiting values respectively which may be selected and represented by said limiting value representative signal, and $K_1$ is a selected constant.

8. Apparatus as in claim 6 wherein said means for producing said set-point signal comprises means for computing the standard deviation $\sigma$ of said variable property in accordance with the relation $\sigma = \sqrt{\sigma^2}$ wherein $\sigma^2$ is the variance of the property as represented by said variance signal, and means for computing said set value in accordance with one of the relations expressed by $$x_d = x_L + PV + K_2$$
and
$$x_d = x_H - PV - K_2$$

wherein $x_d$ is said set value as presented by said set-point signal, $x_L$ and $x_H$ are low and high limiting values respectively which may be selected and represented by said limiting value representative signal, $PV = 2\sigma$, and $K_2$ is a selected constant.

9. In the combination of processing apparatus for imparting to a traveling material a variable property whose actual value should be maintained as close as possible to a first limiting value without crossing said limiting value, with a measuring instrument responsive to said property for producing a measurement signal representing the measured value of said property and a controller having an adjustable setting device and being responsive to said measuring instrument for regulating the processing apparatus so as to maintain the mean value of said property substantially equal to a set value determined by the adjustment of said setting device, the improvement of a statistical computer feedback arrangement for automatically causing said mean value to be maintained as close as possible to said limiting value while substantially preventing said actual value from crossing said limiting value, comprising computer means responsive to said measurement signal for repetitively providing a computer output signal, said signal being a function of the statistical variance of said property as computed during one of a plurality of successive periods of time, said signal changing in value at the ends of said time periods with changes in said variance, means responsive to said computer output signal for automatically and repetitively readjusting said controller setting device so as to cause said set value to approach said limiting value when said statistical variance decreases and to recede from said limiting value when said statistical variance increases, and means responsive to said measurement signal during said time periods for producing a triggering signal when a variation of said measurement signal exceeds a second limiting value.

10. Apparatus as in claim 9 including means responsive to said triggering signal means for producing an incremental readjustment of said controller setting device so as to cause said set value to recede from said first limiting value when said variation of said measurement signal exceeds said second limiting value.

11. Apparatus as in claim 9 including means responsive to said triggering signal for producing a sensory warning signal.

12. Apparatus as in claim 9 wherein said triggering signal means comprises computer means for maintaining a continually updated running estimate of the variance value to be expected at the end of the currently running one of said time periods and for producing a synthetic variance signal indicative of the value of said estimate, alarm limit selector means for producing an alarm limit signal indicative of a predetermined value, and means responsive to said synthetic variance signal and said alarm limit signal for producing said triggering signal.

13. In the combination of a processing apparatus for imparting to a traveling material a variable property whose actual value should be maintained as close as possible to a limiting value without crossing said limiting value, with a measuring instrument responsive to said property for producing a measurement signal representing the measured value of said property, means for producing a set-point signal representing a reference value for said property, and controller means responsive to said measuring instrument and to said set-point signal for regulating the processing apparatus so as to maintain the mean value of said property substantially equal to a set value determined by the value of said set-point signal, the improvement wherein said set-point signal producing means includes a statistical target set computer comprising a limit setting device for producing a signal representing said limiting value, variance computer means responsive to said measurement signal for repetitively producing a signal representing the statistical variance of said variable property of said material as computed during one of a plurality of successive periods of time, said signal changing in value at the ends of said time periods with changes in said variance, means responsive to said limiting value representative signal and to said variance representative signal for producing said set-point signal and for changing the value thereof with changes in said variance at the ends of said time periods so as to cause said set value represented by said set-point signal to approach said limiting value when said variance decreases and to recede from said limiting value when said variance increases, means responsive to said measurement signal during said time periods for producing a triggering signal when a function of the variation of said measurement signal exceeds a second limiting value, and means responsive to said triggering signal means for producing an incremental readjustment of said controller setting device so as to cause said set value to recede from said first limiting value when said function of the variation of said measurement signal exceeds said second limiting value.

14. Apparatus as in claim 13 wherein said means for producing said set-point signal comprises means for computing the standard deviation $\sigma$ of said variable property in accordance with the relation $\sigma = \sqrt{\sigma^2}$ wherein $\sigma^2$ is the variance of the property as represented by said variance signal, and means for computing said set value in accordance with one of the relations expressed by $$x_d = x_L + \sigma K_1$$
and
$$x_d = x_H - \sigma K_1$$

wherein $x_d$ is said set value as represented by said set-point signal, $x_L$ and $x_H$ are low and high limiting values respectively which may be selected and represented by said limiting value representative signal, and $K_1$ is a selected constant.

15. Apparatus as in claim 13 wherein said means for producing said set-point signal comprises means for computing the standard deviation $\sigma$ of said variable property in accordance with the relation $\sigma = \sqrt{\sigma^2}$ wherein $\sigma^2$ is the variance of the property as represented by said variance signal, and means for computing said set value in accordance with one of the relations expressed by $$x_d = x_L + PV + K_2$$
and
$$x_d = x_H - PV - K_2$$

wherein $x_d$ is said set value as represented by said set-point signal, $x_L$ and $x_H$ are low and high limiting values respectively which may be selected and represented by said limiting value representative signal, $PV = 2\sigma$, and $K_2$ is a selected constant.

16. Apparatus as in claim 13 wherein said function of the variation of said measurement signal comprises a computed estimate of the variance value to be expected at the end of the currently running one of said time periods, and wherein said triggering signal means comprises
   computer means for maintaining a continually updated running value for said estimate and for producing a synthetic variance signal indicative of the value of said estimate,
   alarm limit selector means for producing an alarm limit signal indicative of a predetermined value, and
   means responsive to said synthetic variance signal and said alarm limit signal for producing said triggering signal.

17. A control system for a processing apparatus which imparts to a traveling material a variable property whose actual value as indicated by a measurement signal representing the measured value of said property should be maintained as close as possible to a limiting value without crossing said limiting value, comprising
   controller means having an adjustable setting device and adapted to be responsive to said measurement signal for regulating the processing apparatus so as to maintain the mean value of said property substantially equal to a set value determined by the adjustment of said setting device, and
   computer means adapted to be responsive to said measurement signal for providing a computer output which is a function of the statistical variance of said property and responsive to said computer output for automatically adjusting said controller setting device so as to cause said set value to approach said limiting value when said statistical variance decreases and to recede from said limiting value when said statistical variance increases.

18. Apparatus as in claim 17 wherein said computer means further comprises
   means for producing an output indicative of said limiting value and for mathematically combining said limiting value indicative output with said statistical variance functional output to produce an output indicative of said set value, the adjustment of said controller setting device being determined by the value of said set value indicative output.

19. Apparatus as in claim 17 wherein said computer repetitively provides said computer output in accordance with a function of the statistical variance of said property as computed during one of a plurality of successive periods of time, said last mentioned output changing in the value at the ends of said time periods with changes in said variance, wherein said controller setting device is repetitively readjusted in accordance with said changing value, and wherein said control system further comprises
   means responsive to said measurement signal during said time periods for producing a triggering signal when a variation of said measurement signal exceeds a second limiting value.

20. Apparatus as in claim 19 including
   means responsive to said triggering signal means for producing an incremental readjustment of said controller setting device so as to cause said set value to recede from said first limiting value when said variation of said measurement signal exceeds said second limiting value.

21. Apparatus as in claim 19 including
   means responsive to said triggering signal for producing a sensory warning signal.

22. Apparatus as in claim 19 wherein said triggering signal means comprises
   computer means for maintaining a continually updated running estimate of the variance value to be expected at the end of the currently running one of said time periods and for producing a synthetic variance signal indicative of the value of said estimate,
   alarm limit selector means for producing an alarm limit signal indicative of a predetermined value, and
   means responsive to said synthetic variance signal and said alarm limit signal for producing said triggering signal.

References Cited

UNITED STATES PATENTS

| | | | |
|---|---|---|---|
| 2,398,988 | 4/1946 | Ziebolz | 235—151.13 X |
| 2,897,638 | 8/1959 | Maker | 235—151.13 X |
| 3,147,370 | 9/1964 | Lowman | 235—151.13 |
| 3,260,838 | 7/1966 | Anderson | 235—151.13 X |

OTHER REFERENCES

"Statistical Computers Can Really Reduce Data," by Schubert, from "Control Engineering," April 1960, pp. 146–150.

EUGENE G. BOTZ, Primary Examiner